United States Patent
Yardibi et al.

(10) Patent No.: US 11,193,387 B2
(45) Date of Patent: Dec. 7, 2021

(54) PERFORMANCE AND LIFE OPTIMIZING CONTROL SYSTEM FOR A TURBINE ENGINE

(71) Applicant: General Electric Company, Schenectady, NY (US)

(72) Inventors: Tarik Yardibi, Reading, MA (US); Jacques Paul, Somerville, MA (US)

(73) Assignee: General Electric Company, Schenectady, NY (US)

(*) Notice: Subject to any disclaimer, the term of this patent is extended or adjusted under 35 U.S.C. 154(b) by 18 days.

(21) Appl. No.: 15/646,369

(22) Filed: Jul. 11, 2017

(65) Prior Publication Data

US 2019/0017409 A1    Jan. 17, 2019

(51) Int. Cl.

| F01D 21/00 | (2006.01) |
|---|---|
| F02C 3/04 | (2006.01) |
| F02C 9/46 | (2006.01) |
| F02C 9/20 | (2006.01) |
| F02C 9/00 | (2006.01) |
| F01D 21/14 | (2006.01) |
| G05B 23/02 | (2006.01) |

(52) U.S. Cl.
CPC ........... *F01D 21/003* (2013.01); *F01D 21/14* (2013.01); *F02C 3/04* (2013.01); *F02C 9/00* (2013.01); *F02C 9/20* (2013.01); *F02C 9/46* (2013.01); *F05D 2220/323* (2013.01); *F05D 2260/80* (2013.01); *F05D 2260/821* (2013.01); *F05D 2270/02* (2013.01); *F05D 2270/11* (2013.01); *F05D 2270/71* (2013.01); *G05B 23/0283* (2013.01)

(58) Field of Classification Search
None
See application file for complete search history.

(56) References Cited

U.S. PATENT DOCUMENTS

| 6,487,491 | B1 | 11/2002 | Karpman et al. | |
|---|---|---|---|---|
| 6,886,472 | B2 | 5/2005 | Jammu et al. | |
| 7,027,953 | B2 * | 4/2006 | Klein | G01H 1/006 |
| | | | | 702/182 |
| 7,769,507 | B2 | 8/2010 | Volponi et al. | |
| 8,280,702 | B2 | 10/2012 | Herman | |
| 8,315,741 | B2 * | 11/2012 | Karpman | F02C 9/28 |
| | | | | 415/115 |
| 8,321,118 | B2 | 11/2012 | Moeckly et al. | |
| 8,478,479 | B2 | 7/2013 | Ghelam | |
| 8,668,434 | B2 * | 3/2014 | Karpman | F01D 21/003 |
| | | | | 415/7 |
| 8,914,149 | B2 * | 12/2014 | Safa-Bakhsh | G07C 5/006 |
| | | | | 700/245 |
| 9,317,249 | B2 | 4/2016 | Moeckly et al. | |

(Continued)

*Primary Examiner* — Truc M Do
(74) *Attorney, Agent, or Firm* — Dority & Manning, P.A.

(57) ABSTRACT

Systems and methods for controlling powerplants that include and/or leverage one or more health models to proactively optimize component life or minimize damage of one or more components of the powerplant are provided. In one exemplary aspect, a control system for a powerplant feeds engine data into one or more health models. The health models output health data indicative of a condition of one or more components of the powerplant. The control system utilizes the health data outputs to proactively control the components of the powerplant in such a way so as to optimize component life/damage.

20 Claims, 7 Drawing Sheets

(56) References Cited

U.S. PATENT DOCUMENTS

| | | | | |
|---|---|---|---|---|
| 2004/0176887 | A1* | 9/2004 | Kent | G05B 23/0221 701/29.5 |
| 2005/0096873 | A1* | 5/2005 | Klein | G01H 1/006 702/184 |
| 2010/0023238 | A1* | 1/2010 | Adibhatla | G05B 23/0254 701/100 |
| 2010/0161247 | A1* | 6/2010 | Moeckly | F02C 7/00 702/41 |
| 2010/0275575 | A1* | 11/2010 | Brown | F02C 9/28 60/204 |
| 2011/0077783 | A1* | 3/2011 | Karpman | G05B 17/02 700/283 |
| 2013/0158832 | A1* | 6/2013 | Moeckly | F02C 9/00 701/101 |
| 2013/0184901 | A1* | 7/2013 | Wall | B60W 50/0097 701/3 |
| 2013/0211737 | A1* | 8/2013 | Batcheller | G01M 7/00 702/34 |
| 2013/0304307 | A1* | 11/2013 | Safa-Bakhsh | G07C 5/006 701/31.4 |
| 2014/0156166 | A1* | 6/2014 | Moeckly | F02D 45/00 701/102 |
| 2014/0163838 | A1* | 6/2014 | Moeckly | F02C 9/00 701/100 |
| 2014/0365036 | A1* | 12/2014 | Moeckly | F02C 9/00 701/3 |
| 2015/0274314 | A1 | 10/2015 | Conrad | |
| 2016/0052410 | A1* | 2/2016 | Zhou | B60L 11/1811 320/109 |
| 2016/0052505 | A1* | 2/2016 | Zhou | B60L 7/14 701/22 |
| 2016/0086396 | A1 | 3/2016 | Nutaro et al. | |
| 2016/0273379 | A1* | 9/2016 | Soares, Jr. | G05B 23/0254 |
| 2017/0175646 | A1* | 6/2017 | Adibhatla | F02C 9/18 |
| 2018/0047225 | A1* | 2/2018 | Batcheller | G07C 5/008 |
| 2018/0257683 | A1* | 9/2018 | Govindappa | B61L 15/0081 |
| 2018/0297718 | A1* | 10/2018 | Adibhatla | B64F 5/60 |

\* cited by examiner

PERFORMANCE AND LIFE OPTIMIZING CONTROL SYSTEM FOR A TURBINE ENGINE

FIELD

The present subject matter relates generally to turbine engines. More particularly, the subject matter relates to control systems for turbine engines.

BACKGROUND

Turbine engine components deteriorate over their service lives. Health models, such as e.g., damage accumulation and lifing models, have been used to predict the damage sustained and operational service lives of such components. Conventionally, the outputs of health models have been used post-hoc to characterize the cumulative damage to certain components of turbine engines such that maintenance, repair, and/or overhauls can be scheduled. However, conventionally, the outputs of such health models have not been used proactively to control turbine engines such that component usage life can be maximized and damage thereto can be minimized.

Therefore, improved systems and methods for controlling turbine engines would be useful. More particularly, improved control systems for turbine engines that leverage health model outputs to maximize component life/minimize damage would be beneficial.

BRIEF DESCRIPTION

Exemplary aspects of the present disclosure are directed to systems and methods for controlling turbine engines. Aspects and advantages of the invention will be set forth in part in the following description, or may be obvious from the description, or may be learned through practice of the invention.

In one exemplary aspect, the present disclosure is directed to a method for controlling the operation of a powerplant that includes one or more components. The method includes obtaining, by one or more computing devices, health data descriptive of a condition of one or more of the components of the powerplant. The method also includes determining, by the one or more computing devices, one or more health trims for one or more of the components of the powerplant based at least in part on the health data. The method also includes adjusting one or more of the one or more components of the powerplant based at least in part on the one or more health trims.

In another exemplary aspect, the present disclosure is directed to a gas turbine engine. The gas turbine engine includes a compressor section, a combustion section, and a turbine section arranged in serial flow order. The compressor section, the combustion section, and the turbine section at least partially defining a core air flowpath. The gas turbine engine also includes a rotary component rotatable with at least one of a portion of the compressor section and a portion of the turbine section. The gas turbine engine further includes a control system. The control system includes one or more actuators operatively configured to actuate one or more components of the gas turbine engine. The control system also includes a computing system comprising one or more computing devices communicatively coupled with the one or more actuators, the one or more computing devices comprising one or more processors and one or more memory devices, the one or more memory devices storing instructions that when executed by the one or more processors cause the one or more processors to perform operations, the one or more computing devices configured to: obtain health data descriptive of a condition of one or more of the components of the gas turbine engine; determine one or more health trims for one or more of the components of the gas turbine engine based at least in part on the health data, the one or more health trims indicative of instructions for actuating the one or more components; and control the one or more actuators to adjust the one or more components of the gas turbine engine based at least in part on the one or more health trims.

In yet another exemplary aspect, the present disclosure is directed to a method for controlling the operation of a gas turbine engine for a vehicle, the gas turbine engine includes one or more components. The method includes obtaining, by one or more computing devices, health data descriptive of a condition of one or more of the components of the gas turbine engine and an objective function descriptive of one or more performance parameters to optimize during operation of the gas turbine engine. The method also includes determining, by the one or more computing devices, one or more health trims for one or more of the components of the gas turbine engine based at least in part on the health data. The method further includes determining, by the one or more computing devices, one or more performance trims for one or more of the components of the gas turbine engine based at least in part on the objective function. Moreover, the method also includes adjusting one or more of the components of the gas turbine engine based at least in part on the health trims and the performance trims.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
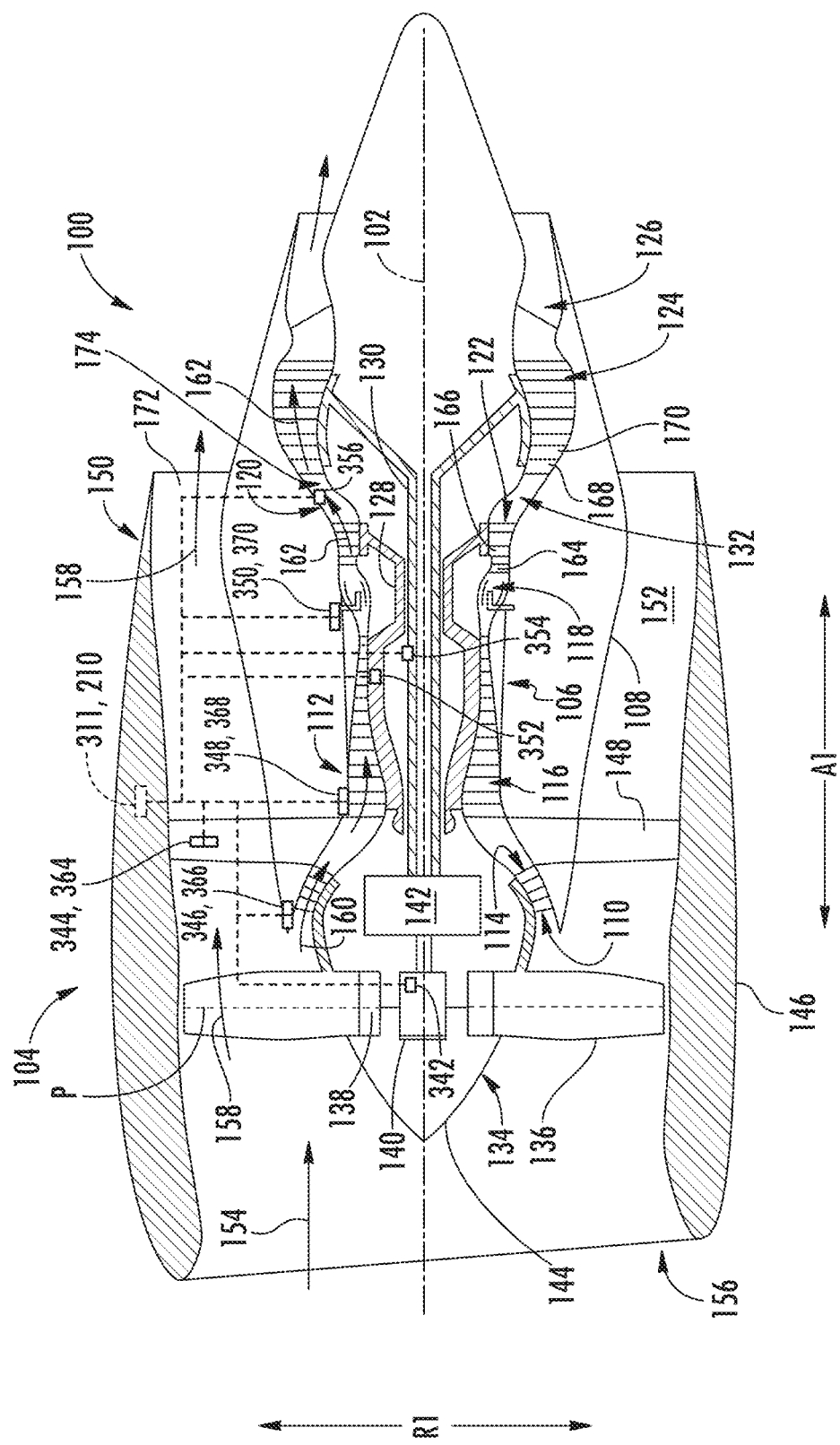
FIG. 1 provides a schematic cross-sectional view of an exemplary gas turbine engine according to an exemplary embodiment of the present disclosure.

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations that come within the scope of the appended claims and their equivalents.

Exemplary aspects of the present disclosure are directed to systems and methods for controlling powerplants (e.g., gas turbine engines) that include and/or leverage one or more health models to proactively optimize component life or minimize damage of one or more components of the powerplant. In particular, in one exemplary aspect, the present disclosure is directed to a control system for a powerplant that leverages the outputs of a health model to determine various health trims for one or more components of the powerplant. For instance, one health trim might be instructions for actuating a variable geometry component of the powerplant to a different position or orientation. Once the health trims are determined, they are used to adjust one or more components of the powerplant. The health trims are used to adjust the components in such a way so as to optimize component life/damage. In some exemplary aspects, one or more components of the powerplant can be adjusted in real time based on the outputs of one or more health models. In another exemplary aspect, a method is provided for operating a powerplant utilizing a control system that leverages the outputs of one or more health models such that component life/damage is optimized.

Further aspects and advantages of the present subject matter will be apparent to those of skill in the art. Exemplary aspects of the present disclosure will be discussed in further detail with reference to the drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis. Moreover, the term "obtaining" means affirmatively or passively gaining, attaining, acquiring, collecting, or otherwise receiving the noted object, information, signal, data, transmission, communication, etc.

Turning now to the drawings, FIG. 1 is a schematic cross-sectional view of a powerplant according to an exemplary embodiment of the present disclosure. More particularly, for the embodiment of FIG. 1, the powerplant is a gas turbine engine 100 configured as an aeronautical, high-bypass turbofan jet engine for an aircraft. It will be appreciated that the exemplary gas turbine engine 100 depicted in FIG. 1 is by way of example only and that in other exemplary embodiments the gas turbine engine 100 may have any other suitable configuration. Additionally or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aeroderivative gas turbine engine, such as a nautical gas turbine engine.

As shown in FIG. 1, the gas turbine engine 100 defines an axial direction A1 (extending parallel to or coaxial with a longitudinal centerline 102 provided for reference), a radial direction R1, and a circumferential direction C1 (i.e., a direction extending about the axial direction A1; not depicted in FIG. 1). In general, the gas turbine engine 100 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section 112 including a first, booster or LP compressor 114 and a second, HP compressor 116; a combustion section 118; a turbine section 120 including a first, HP turbine 122 and a second, LP turbine 124; and a jet exhaust nozzle section 126. An HP shaft or spool 128 drivingly connects the HP turbine 122 to the HP compressor 116. ALP shaft or spool 130 drivingly connects the LP turbine 124 to the LP compressor 114. The compressor section, combustion section 118, turbine section, and jet exhaust nozzle section 126 together define a core air flowpath 132 through the core turbine engine 106.

Referring still the embodiment of FIG. 1, the fan section 104 includes a variable pitch fan 134 having a plurality of fan blades 136 coupled to a disk 138 in a circumferentially spaced apart manner. As depicted, the fan blades 136 extend outwardly from disk 138 generally along the radial direction R. Each fan blade 136 is rotatable relative to the disk 138 about a pitch axis P by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by LP shaft 130 across a power gear box 142. The power gear box 142 includes a plurality of gears for stepping down the rotational speed of the LP shaft 130 to a more efficient rotational fan speed.

Referring still to the exemplary embodiment of FIG. 1, the disk 138 is covered by rotatable spinner 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the core turbine engine 106. Moreover, for the embodiment depicted, the nacelle 146 is supported relative to the core turbine engine 106 by a plurality of circumferentially spaced outlet guide vanes 148. Further, a downstream section 150 of the nacelle 146 extends over an outer portion of the core turbine engine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air as indicated by arrows 158 is directed or routed into the bypass airflow passage 152 and a second portion of the air as indicated by arrow 160 is directed or routed into the LP compressor 114. The pressure of the second portion of air 160 is then increased as it is routed through the HP compressor 116 and into the combustion section 118.

Referring still to FIG. 1, the compressed second portion of air 160 from the compressor section mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the core turbine engine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define a hot gas path 174 for routing the combustion gases 162 through the core turbine engine 106.

Figure 2:
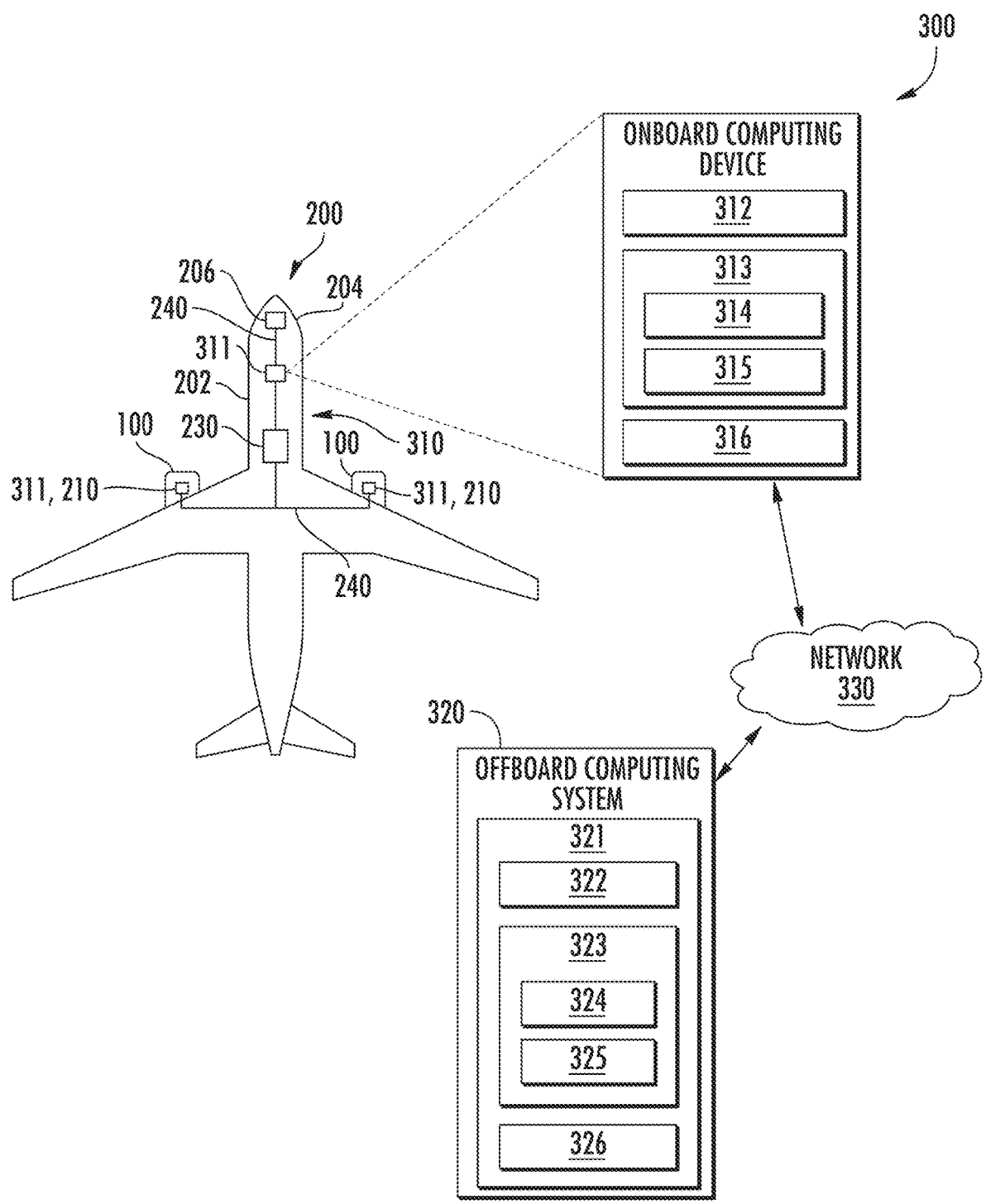
FIG. 2 provides a schematic view of an exemplary aircraft and computing system according to an exemplary embodiment of the present disclosure.

FIG. 2 provides a schematic view of an exemplary aircraft 200 and computing system 300 according to an exemplary embodiment of the present disclosure. For this embodiment, the aircraft 200 includes gas turbine engines (such as e.g., the exemplary gas turbine engine 100 of FIG. 1) mounted to or integral with respective wings of the aircraft 200. The aircraft also includes a fuselage 202, a cockpit 204, and a display 206 for displaying information to the flight crew. Moreover, for this embodiment, the computing system 300 includes an onboard computing system 310 located onboard the aircraft 200 and an offboard computing system 320 located offboard the aircraft 200. The onboard computing system 310 is communicatively coupled with the offboard computing system 320 via a network 330. The network 330 can be any suitable type of communications network, such as e.g., a local area network (e.g., intranet), wide area network (e.g., Internet), or some combination thereof and can include any number of wired or wireless links. In general, communication over the network 330 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

As shown in FIG. 2, the onboard computing system 310 of computing system 300 includes one or more computing devices 311, including engine controllers 210 operatively configured to control their respective gas turbine engines 100. Each engine controller 210 can be, for example, an Electronic Engine Controller (EEC) or a Digital Engine Controller (DEC) equipped with Full Authority Digital Engine Control (FADEC). Each engine controller 210 can be communicatively coupled with one another and/or other computing devices 311, such as e.g., a mission computer, a flight management computer, etc. via any suitable wired and/or wireless connection. The onboard computing system 310 also includes a communication network 230 that facilitates communication between components of onboard computing system 310 as well as communication with offboard computing system 320, other aircraft, and ground-based objects or systems. The onboard computing system 310 further includes a communication bus 240 that communicatively couples the various components of onboard computing system 310.

Each computing device 311 of the onboard computing system 310 can include one or more processor(s) 312 and one or more memory device(s) 313. The one or more processor(s) 312 can include any suitable processing device, such as a microprocessor, microcontroller, integrated circuit, logic device, and/or other suitable processing device. The one or more memory device(s) 313 can include one or more computer-readable media, including, but not limited to, non-transitory computer-readable media, RAM, ROM, hard drives, flash drives, and/or other memory devices.

The one or more memory device(s) 313 can store information accessible by the one or more processor(s) 312, including computer-readable instructions 314 that can be executed by the one or more processor(s) 312. The instructions 314 can be any set of instructions that when executed by the one or more processor(s) 312, cause the one or more processor(s) 312 to perform operations. In some embodiments, the instructions 314 can be executed by the one or more processor(s) 312 to cause the one or more processor(s) 312 to perform operations, such as any of the operations and functions for which the computing devices 311 are configured. The instructions 314 can be software written in any suitable programming language or can be implemented in hardware. Additionally, and/or alternatively, the instructions 314 can be executed in logically and/or virtually separate threads on processor(s) 312.

The memory device(s) 313 can further store data 315 that can be accessed by the one or more processor(s) 312. For example, the data 315 can include engine or aircraft data captured or collected by one or more sensors of the engine or aircraft. The data 315 can also include, for example, health data outputted by one or more health models. The engine, aircraft, and/or health data can be stored in one of the memory device(s) 313 of one of the computing devices 311, which can be downloaded or transmitted to other computing systems as further described herein, such as e.g., offboard computing system 320.

The computing devices 311 can also each include a communication interface 316 used to communicate with the other components of the aircraft 200 (e.g., via communication bus 240). The communication interface 316 can include any suitable components for interfacing with one or more network(s), including e.g., transmitters, receivers, ports, controllers, antennas, and/or other suitable components.

Each of the computing devices 311 of the onboard computing system 310 are communicatively coupled with communication network 230. Communication network 230 can include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the aircraft 200, such as to a cloud computing environment and/or the offboard computing system 320. Such networking environments may use a wide variety of communication protocols. The communication network 230 can also be coupled to the engine controllers 210 and other computing devices 311 by communication bus 240, which can be a wired or wireless communication bus.

The offboard computing system 320 can likewise include one or more computing devices 321. Each computing device 321 of the offboard computing system 320 can include one or more processor(s) 322 and one or more memory device(s) 323. The one or more processor(s) 322 can include any suitable processing device, such as a microprocessor, microcontroller, integrated circuit, logic device, and/or other suitable processing device. The one or more memory device(s) 323 can include one or more computer-readable media, including, but not limited to, non-transitory computer-readable media, RAM, ROM, hard drives, flash drives, and/or other memory devices.

The one or more memory device(s) 323 can store information accessible by the one or more processor(s) 322, including computer-readable instructions 324 that can be executed by the one or more processor(s) 322. The instructions 324 can be any set of instructions that when executed by the one or more processor(s) 322, cause the one or more processor(s) 322 to perform operations. In some embodiments, the instructions 324 can be executed by the one or more processor(s) 322 to cause the one or more processor(s) 322 to perform operations, such as any of the operations and functions for which the computing devices 321 are configured. The instructions 324 can be software written in any suitable programming language or can be implemented in hardware. Additionally, and/or alternatively, the instructions 324 can be executed in logically and/or virtually separate threads on processor(s) 322.

The memory device(s) 323 can further store data 325 that can be accessed by the one or more processor(s) 322. For example, the data 325 can include engine, aircraft, health, and/or service data. The data 325 can be stored in one of the memory device(s) 323 of one of the computing devices 321, for example, which can be downloaded, uploaded, or transmitted to other computing systems.

The computing devices 321 can also each include a communication interface 326 used to communicate, for example, with the other components of the aircraft 200 (e.g., via communication network 230). The communication interface 326 can include any suitable components for interfacing with one or more network(s), including for example, transmitters, receivers, ports, controllers, antennas, and/or other suitable components.

The computing system 300 illustrated in FIG. 2 is provided by way of example only. The components, systems, connections, and/or other aspects illustrated in FIG. 2 are optional and are provided as examples of what is possible, but not required, to implement the present disclosure.

Returning to FIG. 1, as shown, the gas turbine engine 100 includes various sensors and actuators communicatively coupled with computing device 311, which is engine controller 210 in this embodiment. The engine controller 210 and the sensors and actuators can be communicatively coupled in any suitable manner, such as e.g., by any suitable wired or wireless connections. For the depicted embodiment of FIG. 1, the engine controller 210 is positioned along the outer nacelle 146 and is integral with or connected to the outer nacelle 146. However, the engine controller 210 can be positioned or connected to any suitable portion or part of the gas turbine engine 100.

The sensors of the gas turbine engine 100 are operatively configured to sense, measure, or otherwise collect various operating parameters of the gas turbine engine 100 during operation. The operating parameters can include, for example, temperatures, pressures, and mass flows at various stations of the gas turbine engine, as well as the torque, rotational speed, etc. of various components of the gas turbine engine during operation. The operating parameters can also include various flight conditions, such as e.g., ambient temperature, altitude, angle of attack of the vehicle, the airspeed or groundspeed of the vehicle, etc. In addition, various sensors of the gas turbine engine 100 are operatively configured to sense the position or orientation of one or more components of the gas turbine engine 100 during operation. The actuators of the gas turbine engine 100 are operatively configured to actuate one or more components of the gas turbine engine 100. In this way, one or more components of the gas turbine engine 100 can be actuated such that the gas turbine engine 100 can be controlled.

By way of example, for the illustrated embodiment of FIG. 1, the gas turbine engine 100 includes a fan pitch sensor 342 positioned integral with or proximate to the fan 134. The fan pitch sensor 342 is operatively configured to sense or measure the pitch angle of the fan blades 136. That is, when the actuator, which is the actuation member 140 in this example, obtains a control command to actuate the fan blades 136, the fan pitch sensor 342 senses the pitch of the fan blades 136 and can send one or more feedback communications to the controller 210 indicative of the pitch or position of the fan blades 136. By adjusting the fan blades 136, the mass flow through the bypass airflow passage 152 or core inlet 110 of the gas turbine engine 100 can be adjusted. In this manner, the gas turbine engine 100 can be controlled by actuating the fan blades 136 about their respective pitch axes P.

As another example, the gas turbine engine 100 can include a fan outlet guide vane (OGV) sensor 344 positioned integral with or proximate to the fan outlet guide vanes 148. The fan OGV sensor 344 is operatively configured to sense or measure the pitch angle or position of the outlet guide vanes 148. Moreover, the gas turbine engine 100 can include a fan OGV actuator 364 positioned integral with or proximate to the fan OGVs 148. The fan OGV actuator 364 is operatively configured to actuate the fan OGVs 148 through a plurality of pitch angles. When the fan OGV actuator 364 obtains a control command to actuate the fan OGVs 148, the fan OGV sensor 344 senses the pitch of the fan OGVs 148 and can send one or more feedback communications to the controller 210 indicative of the pitch or position of the fan OGVs 148. By adjusting the fan OGVs 148, the mass flow through the bypass airflow passage 152 can be adjusted. In this way, the gas turbine engine 100 can be controlled by actuating the fan OGVs 148.

Referring still to FIG. 1, as yet another example, the gas turbine engine 100 can also include an inlet guide vane (IGV) sensor 346 positioned integral with or proximate to the inlet guide vanes (not labeled) of the LP compressor 114. The IGV sensor 346 is operatively configured to sense or measure the pitch angle or position of the IGV's of the LP compressor 114. Moreover, for this embodiment, the gas turbine engine 100 includes an IGV actuator 366 positioned integral with or proximate to the IGVs of the LP compressor 114. The IGV actuator 366 is operatively configured to actuate the IGVs through a plurality of pitch angles. When the IGV actuator 366 obtains a control command to actuate the IGVs, the IGV sensor 346 senses the pitch of the IGVs and can send one or more feedback communications to the controller 210 indicative of the pitch or position of the IGVs. By adjusting the IGVs of the LP compressor 114, the mass flow through the LP compressor 114 and remaining sections of the gas turbine engine 100 can be adjusted. Accordingly, the gas turbine engine 100 can be controlled by actuating the IGVs of the LP compressor 114.

With reference still to FIG. 1, as another example, the gas turbine engine 100 further includes an HP stator vane sensor 348 positioned integral with or proximate to the HP compressor 116. The HP stator vane sensor 348 is operatively configured to sense or measure the pitch angle of the variable geometry stator vanes of the HP compressor 116. Moreover, for this embodiment, the gas turbine engine 100 includes an HP stator vane actuator 368 positioned integral with or proximate to the HP compressor 116, and more particularly to the variable geometry stator vanes of the HP compressor 116. The HP stator vane actuator 368 is operatively configured to actuate the variable geometry stator vanes through a plurality of pitch angles. When the HP stator vane actuator 368 obtains a control command to actuate the HP stator vanes, the HP stator vane sensor 348 senses the pitch of the vanes and can send one or more feedback communications to the controller 210 indicative of the pitch or position of the HP stator vanes. By adjusting the stator vanes of the HP compressor 116, the mass flow through the HP compressor 116 and remaining sections of the gas turbine engine 100 can be adjusted. In this manner, the gas turbine engine 100 can be controlled by actuating the HP stator vanes of the HP compressor 116.

Additionally, as further shown in FIG. 1, the gas turbine engine 100 includes a fuel flow sensor 350 positioned proximate the combustion section 118. More particularly, the fuel flow sensor 350 is positioned proximate one or more fuel nozzles or fuel/air mixers. In this way, the flow sensor 350 is operatively configured to sense or measure the amount fuel injected into the combustion chamber of the combustion section 118. In addition, for this embodiment, the gas turbine engine 100 includes a fuel actuator or fuel control valve 370 positioned integral with or proximate to the combustion section 118. The fuel control valve 370 is operatively configured to selectively allow an amount of fuel into the combustion chamber of the combustion section 118. In particular, when the fuel control valve 370 obtains a control command to actuate to a more open or a more closed position, the fuel flow sensor 350 senses the volume or rate of fuel flow and can send one or more feedback communications to the controller 210 indicative of the fuel flow or rate or the position of the valve. By controlling the position of the fuel control valve 370, the fuel flow into the combustion chamber is adjusted, and as a result, the power output of the gas turbine engine 100 is adjusted. In this manner, the gas turbine engine 100 can be controlled by actuating the fuel control valve 370.

As further shown in FIG. 1, the gas turbine engine 100 includes an HP shaft sensor 352 and a LP shaft sensor 354 positioned integral with proximate to the HP shaft 128 and the LP shaft 130, respectively. The HP shaft sensor 352 and the LP shaft sensor 354 are each operatively configured to sense or measure the rotational speed of their respective shafts. Additionally or alternatively, the HP shaft sensor 352 and the LP shaft sensor 354 are each operatively configured to sense or measure the torque or torque output of their respective shafts. By knowing one or both of these operating parameters, the controller 210 can control or adjust one of more actuators such that the rotational speed or torque output of the HP shaft 128 or LP shaft 130 is adjusted.

The gas turbine engine 100 can further include various pressure and temperature sensors. For instance, for this exemplary embodiment, the gas turbine engine 100 includes a temperature sensor 356 at station T45, or a location along the core air flowpath 132 between the HP turbine 122 and the LP turbine 124. The temperature sensor 356 is operatively configured to sense or measure the temperature at station T45. By knowing the temperature and pressures at various stages of the gas turbine engine 100, the controller 210 can control or adjust one or more actuators such that the temperature, pressure, or both is adjusted at that particular station. It will be appreciated that the gas turbine engine 100 can include other sensors not specifically mentioned above. For instance, the gas turbine engine 100 can include one or more sensors for sensing or measuring mass flow rates at particular stations along the core air flowpath 132 or the high bypass airflow passage 152. As another example, the gas turbine engine 100 can include sensors operatively configured to sense the pitch angle position of one or more variable geometry components of the gas turbine engine 100. It will further be appreciated that the gas turbine engine 100 may not include all of the sensors noted above.

Figure 3:
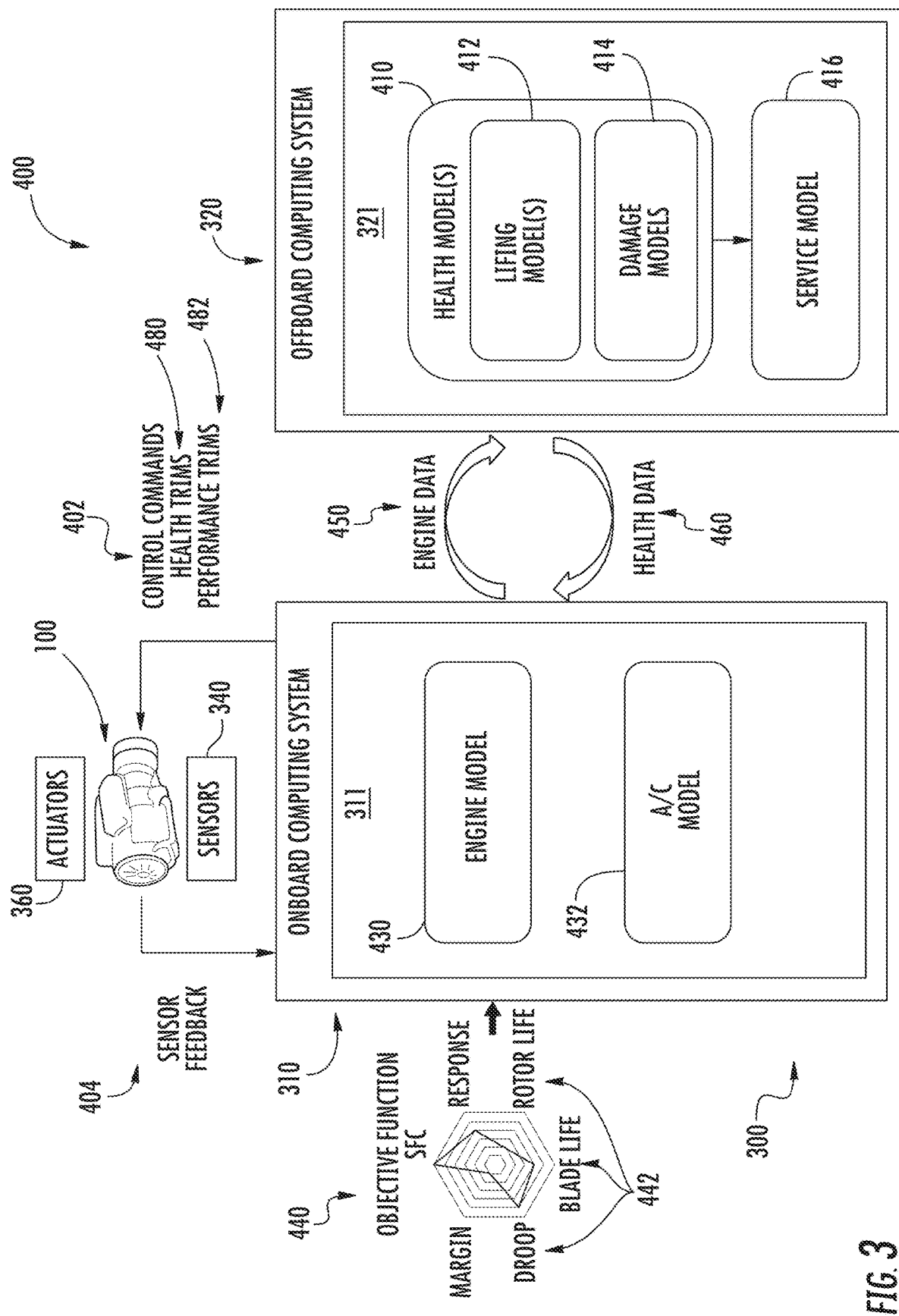
FIG. 3 provides a schematic view of an exemplary control system according to an exemplary embodiment of the present disclosure.

FIG. 3 provides a schematic view of an exemplary control system 400 for a powerplant according to an exemplary embodiment of the present disclosure. For this embodiment, the control system 400 is operatively configured to control a powerplant during operation in such a way so as to optimize the service life/damage of one or more components of the powerplant. Additionally, for this embodiment, the control system 400 is operatively configured to optimize performance and/or efficiency of the powerplant. The control system 400 of FIG. 3 can be a control system for the exemplary gas turbine engine(s) 100 of FIGS. 1 and 2, for example. The gas turbine engine 100 can be operatively coupled with the aircraft 200 of FIG. 2, for example. The control system 400 includes computing system 300, which includes onboard computing system 310 and offboard computing system 320. Control system 400 also includes one or more sensors 340 and one or more actuators 360, such as e.g., the one or more sensors and one or more actuators depicted in FIG. 1 and described in the accompanying text.

As shown in FIG. 3, the offboard computing system 320 includes one or more offboard computing devices 321 that include one or more health models 410. For the illustrated embodiment of FIG. 3, the health models 410 include one or more lifing model(s) 412 and one or more damage model(s) 414. The output of the one or more lifing model(s) 412 can be, for example, the total time to failure or number of cycles to failure for one or more components of the gas turbine engine 100. Moreover, generally, the output of the one or more damage model(s) 414 can be, for example, the amount of damage or rate of damage of certain components of the gas turbine engine 100. The computing devices 321 of the offboard computing system 320 also include one or more service model(s) 416. Based on the outputs of the health models 410, the one or more service model(s) 416 schedule maintenance, repair, and/or overhauls of the gas turbine engine 100 or one or more components thereof.

One or more of the computing devices 311 of the onboard computing system 310 can include an engine model 430 and an aircraft model 432. The engine model 430 and the aircraft model 432 can both be digital models, for example. For this embodiment, the engine model 430 and the aircraft model 432 are both physics-based models. However, in alternative exemplary embodiments, one or both of the models 430, 432 can be a statistical or machine-learned model. Moreover, in alternative embodiments, the onboard computing system 310 need not include the engine model 430 or the aircraft model 432. The engine model 430 predicts or calculates engine performance and various parameters based on one or more inputs, such as e.g., altitude, Mach number, power lever angle or power setting, inlet temperatures, etc. The engine model 430 can also tune the gas turbine engine 100 in a manner described in greater detail herein. The aircraft model 432 allows a pilot or automated system to control the aircraft or vehicle in accordance with various objective functions, as will be explained more fully below.

Referring still to FIG. 3, the onboard computing system 310 can receive or otherwise obtain an objective function 440. The objective function 440 is descriptive of one or more performance parameters 442 that the control system 400 optimizes or seeks to optimize during operation of the powerplant. As shown in FIG. 3, the performance parameters 442 can include e.g., a specific fuel consumption (SFC), a responsiveness to a change in power setting, rotor or shaft life, blade life (e.g., a turbine or compressor blade), droop, and margin or stall margin. Based on a manual input (e.g., a pilot input) or an automated input (e.g., the happening of a particular event, such as an engine failure or recognition of a particular flight profile), the onboard computing system 310 can optimize one or more of the performance parameters 442 during operation based at least in part on the objective function 440. The control system 400 can optimize the gas turbine engine 100 in accordance with the particular weights assigned or associated with the various performance parameters 442 of the objective function 440. For example, the performance parameters 442 can be weighted as shown by the radar or spider chart in FIG. 3.

The objective function 440 can weigh the performance parameters 442 in any suitable manner and can do so dynamically. For instance, if the control system 400 is controlling a gas turbine engine coupled to an aircraft operating in a cruise phase, SFC can be automatically minimized and rotor and blade life can be maximized or at least optimized. As another example, during takeoff, stall margin and the responsiveness of the engine can be automatically optimized by the control system 400. As yet another example, for military applications, when in combat mode, the control logic used to optimize the performance parameters 442 can be turned off or set to maximize responsiveness of the engine.

In one exemplary aspect of the present disclosure, the control system 400 can optimize engine performance, efficiency and component damage/life of a powerplant in the following manner. With reference to FIG. 3, as the gas turbine engine 100 operates, engine data 450 is collected. For instance, the engine data 450 can be collected by sensors 340. The engine data 450 can include, for example, various measured and calculated operating parameters. As noted above, the operating parameters can include, e.g., temperatures, pressures, and mass flows at various stations of the gas turbine engine, as well as the torque, rotational speed, etc. of various components of the gas turbine engine during operation. The operating parameters can also include various flight conditions, such as e.g., ambient temperature, altitude, angle of attack of the vehicle, the airspeed or groundspeed of the vehicle, etc.

Once collected, the engine data 450 is fed into one or more health models 410 as shown in FIG. 3. The engine data 450 can be routed to the health models 410 during flight in real time or after the flight. The health models 410 utilize the engine data 450 to predict or estimate the health of one or more components of the gas turbine engine 100. The health models 410 can estimate the useful remaining service life or damage to various component of the gas turbine engine 100, such as e.g., the turbine blades 170 of the HP turbine 122, the HP shaft 128, the LP shaft 130, a combination of the foregoing, etc. (FIG. 1).

Next, the outputs of the health model(s) 410, denoted herein as health data 460, are routed to one of the computing devices 311 of the onboard computing system 310. Based on the health data 460, one or more health trims 480 are determined. The health trims 480 represent instructions for actuating one or more of the actuators 360 of the gas turbine engine 100. For example, one health trim 480 can be instructions for actuating the IGVs of the LP compressor 114 via the IGV actuator 366 such that the mass flow through the core turbine engine 106 can be adjusted (FIG. 1). By adjusting the mass flow through the core turbine engine 106, the control system 400 can operate one or more components more or less intensely and thus the control system 400 can optimize the component life/damage of such components. As another example, if the health data 460 indicates that the LP shaft 130 of the gas turbine engine 100 is aging faster than the HP shaft 128, the health trim 480 can be instructions for adjusting the HP shaft 128 such that it is operated in a more intense way so as to reduce the burden on the LP shaft 130. In this way, the service life of the LP shaft 130 can be extended thereby improving the overall engine life and time on wing (TOW) of the engine.

The health data 460 outputs of the health model(s) 410 can additionally be routed to the service model(s) 416 such that the service model 416 can schedule maintenance, repair, and/or overhauls of the gas turbine engine 100 or one or more components thereof.

In addition to optimizing the component life/damage to various components of the gas turbine engine 100, various performance parameters 442 can be optimized as well. In particular, various performance parameters 442 can be optimized in addition to optimizing component damage/life as follows. One or more of the computing devices 311 of the onboard computing system 310 can obtain objective function 440. Based on how the performance parameters 442 are weighted by the objective function 440, one or more computing devices 311 of the onboard computing system 310 can determine performance trims 482. The performance trims 482 represent instructions for actuating one or more of the actuators 360 of the gas turbine engine 100 such that one or more components or mass flows through the gas turbine engine 100 can be adjusted.

The health trims 480 determined based on the health data 460 and the performance trims 482 determined based on the objective function 440 can be added together, resulting in a cumulative trim or control command 402. If the health trim 480 and the performance trim 482 conflict with one another, the control logic or the pilot can prioritize whether engine performance or component health is more of a priority. Once the control commands 402 are determined, the one or more control commands 402 are routed to a corresponding actuator such that one or more components associated with the actuator can be adjusted. In this way, the gas turbine engine 100 can be controlled to optimize the life usage/damage and performance of one or more components.

To ensure the actuators 360 have properly positioned or adjusted the one or more components of the gas turbine engine 100, the one or more sensors 340 can provide sensor feedback 404 to one or more of the computing devices 311 of the onboard computing system 310. The sensor feedback 404 can be indicative of a current position or orientation of the one or more components of the gas turbine engine 100, the position or orientation of one or more of the actuators 360, or a mass flow through the gas turbine engine 100 during operation, for example. The computing devices 311 then can compare the current position of the one or more components of the gas turbine engine 100 (or the position of the actuators or mass flow) with the control commands 402 associated with the component. The computing devices 311 can then determine a delta between the current position of the component and the control commands 402 associated with the component. Thereafter, the computing devices 311 can control the one or more actuators associated with the component to adjust the component based at least in part on the delta. As such, the computing device or devices 311 of the onboard computing system 310 can make adjustments as necessary.

Although the control system 400 of FIG. 3 was described herein as optimizing both engine performance and component life/damage, it will be appreciated that the control system 400 can optimize engine performance and not component life/damage in some instances. Moreover, in some instances, the control system 400 can optimize component life/damage without optimizing engine performance.

Figure 4:
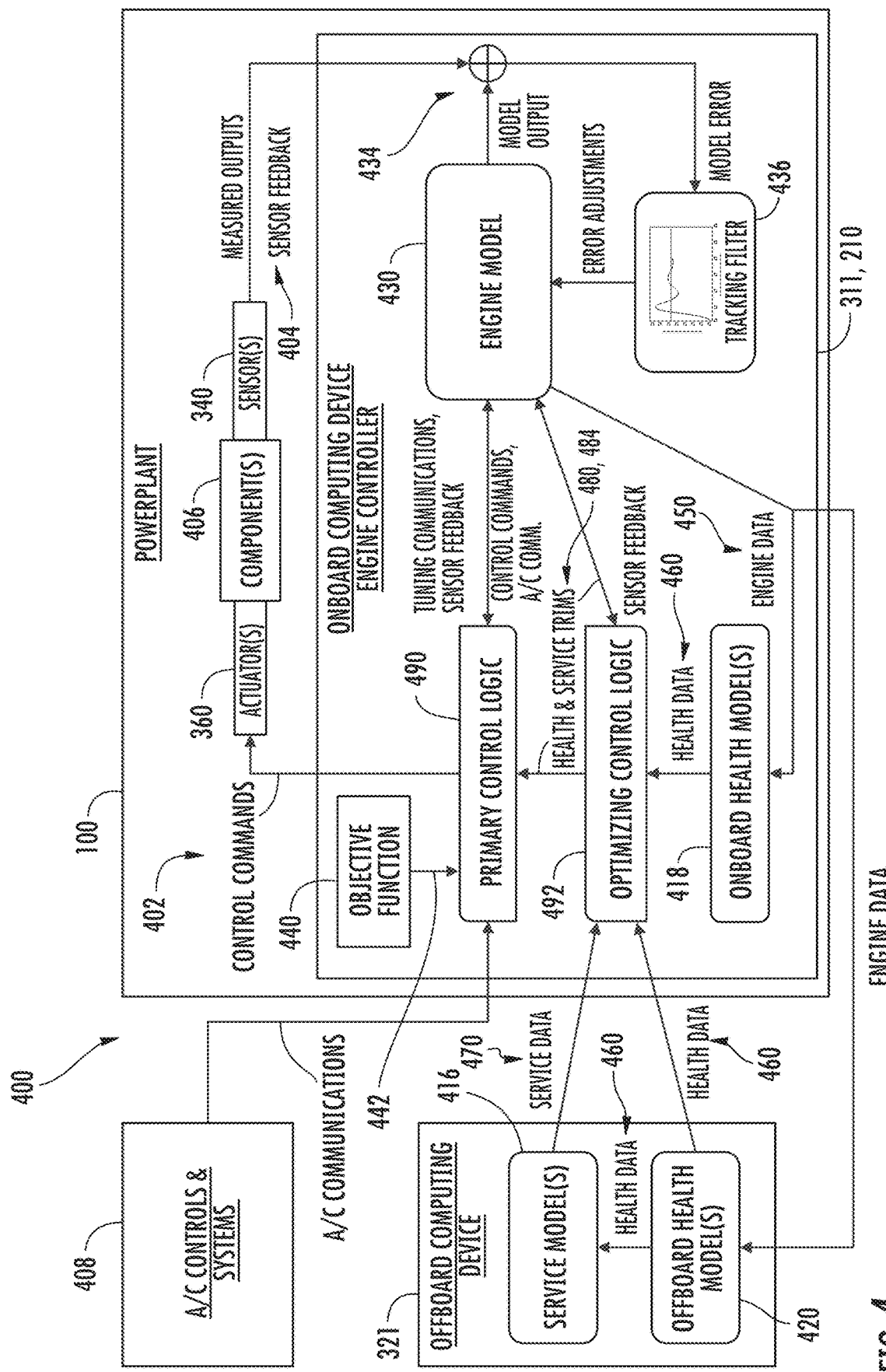
FIG. 4 provides a schematic view of another exemplary control system according to an exemplary embodiment of the present disclosure.

FIG. 4 provides a schematic view of another exemplary control system 400 according to an exemplary embodiment of the present disclosure. The control system 400 of FIG. 4 is operatively configured to optimize component life and/or damage, engine performance, engine efficiency, or a combination of the foregoing. The control system 400 of FIG. 4 can be a control system for the exemplary gas turbine engine(s) 100 of FIGS. 1 and 2, for example. As shown in FIG. 4, the powerplant, which is gas turbine engine 100 operatively coupled to an aircraft in this embodiment, includes one or more components 406. For instance, components 406 can include any of the components of the gas turbine engine(s) 100 depicted in FIGS. 1 and 2 and described in the accompanying text. The one or more components 406 have associated actuators 360 for adjusting or actuating the position of the one or more component 406. The actuators 360 can be any of the actuators depicted in FIG. 1 and described in the accompanying text, for example. The components 406 also have associated sensors 340 for sensing or measuring the position of the component 406 or actuator 360 configured to actuate the component 406. Sensors 340 are also configured to sense or collect operating parameters during operation of the powerplant. Sensors 340 can be any of the sensors depicted in FIG. 1 and described in the accompanying text, for example.

As depicted in FIG. 4, the powerplant also includes onboard computing device 311. The onboard computing device 311, which is an engine controller 210 in this embodiment, includes engine model 430. Thus, for this embodiment, control system 400 is a model-based engine control system. Engine model 430 is operatively configured to tune the powerplant such that it operates in accordance with the model. In particular, the engine model 430 obtains various aircraft communications, such as e.g., altitude, ambient temperature, power lever angle (PLA) or power setting from the aircraft controls, etc. Based on these aircraft communications, engine model 430 determines model outputs that represent optimal parameters for the powerplant. The model outputs of the engine model 430 are routed to a subtraction function 434. At the same time, the sensors 340 of the powerplant measure and sense the actual operating parameters of the powerplant during operation. These measured outputs are also routed to the subtraction function 434 as shown in FIG. 4. The subtraction function 434 determines a model error, or a difference between the measured outputs and the model outputs. The resultant model error is forwarded to a tracking filter 436. The tracking filter 436 determines an error adjustment based on the model error and forwards the error adjustment to the engine model 430. The engine model 430 can then route one or more tuning communications to primary control logic 490. The primary control logic 490 then forwards a control command to the one or more actuators 360 to control the powerplant such that the model error trends to zero. Once tuned, the powerplant is optimized.

As noted above, with reference still to FIG. 4, the engine controller 210 includes primary control logic 490. Primary control logic 490 is operatively configured to control the powerplant during operation, such as e.g., the gas turbine engine(s) 100 of FIGS. 1-2. In particular, for this embodiment, the primary control logic 490 is operatively configured to control the fuel flows, mass flows, shaft or rotor speeds, variable geometry, pressures, temperatures, electric currents and voltages, etc. of the powerplant.

To control the powerplant, the primary control logic 490 obtains a number of inputs. For this embodiment, the primary control logic 490 obtains aircraft communications from various aircraft controls and systems 408. The aircraft communications can include, for instance, the power lever angle (PLA) of the power lever or throttle within the cockpit, or more generally, the power setting. Other aircraft control communications can include the position or orientation of various flight controls of the aircraft, such as e.g., the position of rudders, elevators, or ailerons of a fixed-wing aircraft or the pitch of main or tail rotor of a rotor aircraft. In addition, other aircraft communications can include one or more communications from a flight management or mission computer of the aircraft. For instance, the primary control logic 490 can receive waypoint information (i.e., the origin and destination points of a flight) such that the primary control logic 490 can regulate the fuel flow of the powerplant accordingly. Aircraft communications can also include various flight parameters or conditions. For instance, one or more sensors of the aircraft can sense and provide communications indicative of the altitude, ambient temperature, ambient temperature, altitude, angle of attack of the vehicle, the airspeed or groundspeed of the vehicle, etc. The primary control logic 490 can utilize these aircraft communications to control the powerplant.

The primary control logic 490 can obtain other inputs as well. For instance, the primary control logic 490 can also obtain inputs from objective function 440. In particular, the primary control logic 490 can obtain objective function 440 descriptive of one or more performance parameters 442 to optimize or seek to optimize during operation of the powerplant. For example, as noted above, the objective function 440 can be weighted such that SFC, droop, and blade life are optimized, as shown in FIG. 3. The primary control logic 490 can then determine one or more performance trims 482 (FIG. 3) based at least in part on the objective function 440, and more particularly on the weights of the performance parameters 442 of the objective function 440. In addition, the primary control logic 490 can also obtain sensor feedback 404 from sensors 340 such that primary control logic 490 can ensure that the powerplant is being operated in accordance with the control commands 402. The sensor feedback 404 can be routed from the engine model 430 to the primary control logic 490 as shown in FIG. 4, for example. Additionally or alternatively, the sensor feedback 404 can be routed directly to the primary control logic 490.

As further shown in FIG. 4, primary control logic 490 can also receive or otherwise obtain one or more inputs from optimizing control logic 492. Optimizing control logic 492 is operatively configured to output one or more health trims 480 based at least in part on health data 460. As noted above, the health trims 480 represent instructions for actuating one or more components 406 of the powerplant.

The health data 460, for instance, can be descriptive of a condition of the one or more components of the gas turbine engine 100. In some embodiments, the health data 460 descriptive of the condition of one or more components can be indicative of a remaining useful life of at least one of the one or more components. Additionally or alternatively, in some embodiments, the health data 460 descriptive of the condition of the one or more components can be indicative of an amount of damage to at least one of the one or more components. As shown in FIG. 4, the onboard computing devices 311 and the offboard computing devices 320 obtain engine data 450 from the engine model 430. Based on the engine data 450, the computing devices determine the health data 460 indicative of the condition of one or more of the components of the powerplant.

For this embodiment, the optimizing control logic 492 can obtain health data from the onboard health model 418 as well as the offboard health model 420. The onboard health model 418 provides lifing and damage models for fast life consuming parts, such as e.g., turbine blades. The offboard health model 420 provides lifing and damage models for slow life consuming parts, such as e.g., the HP shaft 128 and the LP shaft 130. By including the onboard health model 410 onboard, the onboard computing system 310 can obtain health data 460 and determine health trims 480 in real time. This allows for adjustment of components of the powerplant in real time, allowing for near instant component life/damage optimization. This can be particularly useful for fast life consuming parts. By including offboard health model 420 offboard, onboard computing resources need not be as extensive. This can, for example, provide for a reduction in weight or cost of the onboard computing system.

In alternative exemplary embodiments, the onboard and offboard health models 418, 420 can be combined into a single onboard model. In yet other exemplary embodiments, the onboard and offboard health models 418, 420 can be combined into a single offboard model. In some embodiments, a single onboard model can be operatively configured to provide lifing and damage models for fast and slow life consuming parts. In some embodiments, a single offboard model can be operatively configured to provide lifing and damage models for fast and slow life consuming parts.

Additionally, the optimizing control logic 492 can obtain service data 470 from offboard service model 416. As shown in FIG. 4, the service model 416 can obtain health data 460 from offboard health model 420 and from onboard health model 418. The service model 416 determines the service data 470 based at least in part on the health data 460 obtained from the onboard and offboard health models 418, 420. The service data 470 is descriptive of when one or more of the components of the gas turbine engine 100 are scheduled for servicing. Servicing, for example, can include when a component is scheduled for maintenance, repair, or overhaul.

The optimizing control logic 492 can use the service data 470 to determine one or more service trims 484. For example, suppose the health data 460 is descriptive of a condition of one or more HP turbine blades 166 of the gas turbine engine 100 (FIG. 1) and that the blades 166 have deteriorated significantly over their service lives. The health data 460 indicates such deterioration. Further suppose that the service data 470 is descriptive of when the HP turbine blades 166 are scheduled for repair and that, according to the service data 470, the turbine blades 166 are scheduled to be repaired the following week. Based at least in part on the service data 470, it may be desirable to extend the life of components other than the turbine blades 166 as they are scheduled for repair the following week. In this example, the optimizing control logic 492 can determine health and service trims 480, 484 that focus on optimizing the component life/damage of other components not scheduled for upcoming repair. In alternative exemplary embodiments, the service model 416 can be located onboard of the powerplant and can be a component of onboard computing system.

Once the optimizing control logic 492 determines the health and service trims 480, 484 based on the health data 460 and the service data 470, respectively, the trims are forwarded to the primary control logic 490. The determined trims can also be forwarded to the engine model 430 for reference. The primary control logic 490 takes into account the health trims 480, the performance trims 482 (determined by the primary control logic 490), the service data 484, the aircraft communications, and sensor feedback 404 to determine the one or more control commands 402. The one or more control commands are a summation of the various trims and communications obtained and is representative of instructions for controlling the one or more actuators 360. As shown in FIG. 4, the control commands 402 are routed from the primary control logic 490 to the one or more actuators 360. Upon receiving the control commands 402, the one or more actuators 360 control or actuate their respective components 406 such that the powerplant is controlled in accordance with the control commands 402.

The optimizing control logic 492 may not always be utilized by the control system 400 to control the powerplant. For instance, where the powerplant is a gas turbine engine for propulsion of a helicopter, there are situations during flight in which safety greatly outweighs the need to optimize component life/damage. For instance, where a helicopter is performing a hover maneuver during a search and rescue mission, the performance and responsiveness of the engine may far outweigh the need to optimize component life/damage. Accordingly, in certain situations, the optimizing control logic 492 is not utilized to control the powerplant. On the other hand, if the helicopter is cruising for an extended period of time, the optimizing control logic 492 can be initialized and used to control the powerplants of the aircraft.

To initialize the optimizing control logic 492, the optimizing control logic 492 can obtain or receive an initializing signal, for example. Alternatively, the primary control logic 490 can obtain the initializing signal and can begin receiving trims from the optimizing control logic 492. The optimizing control logic 492 can be initialized by other suitable methods as well. The optimizing control logic 492 can be initialized manually, e.g., by a pilot, or can be initialized automatically, such as e.g., when the control system 400 recognizes or receives an input that the aircraft or vehicle is operating in a cruise mode. In this way, the optimizing control logic 492 can selectively control the powerplant. If the optimizing control logic 492 is initialized, the optimizing control logic 492 controls the one or more actuators 360 to actuate the one or more components 406 of the powerplant, and if the optimizing control logic 492 is not initialized, the optimizing control logic 492 does not control the one or more actuators 360 to actuate the one or more components 406 of the powerplant.

Figure 5:
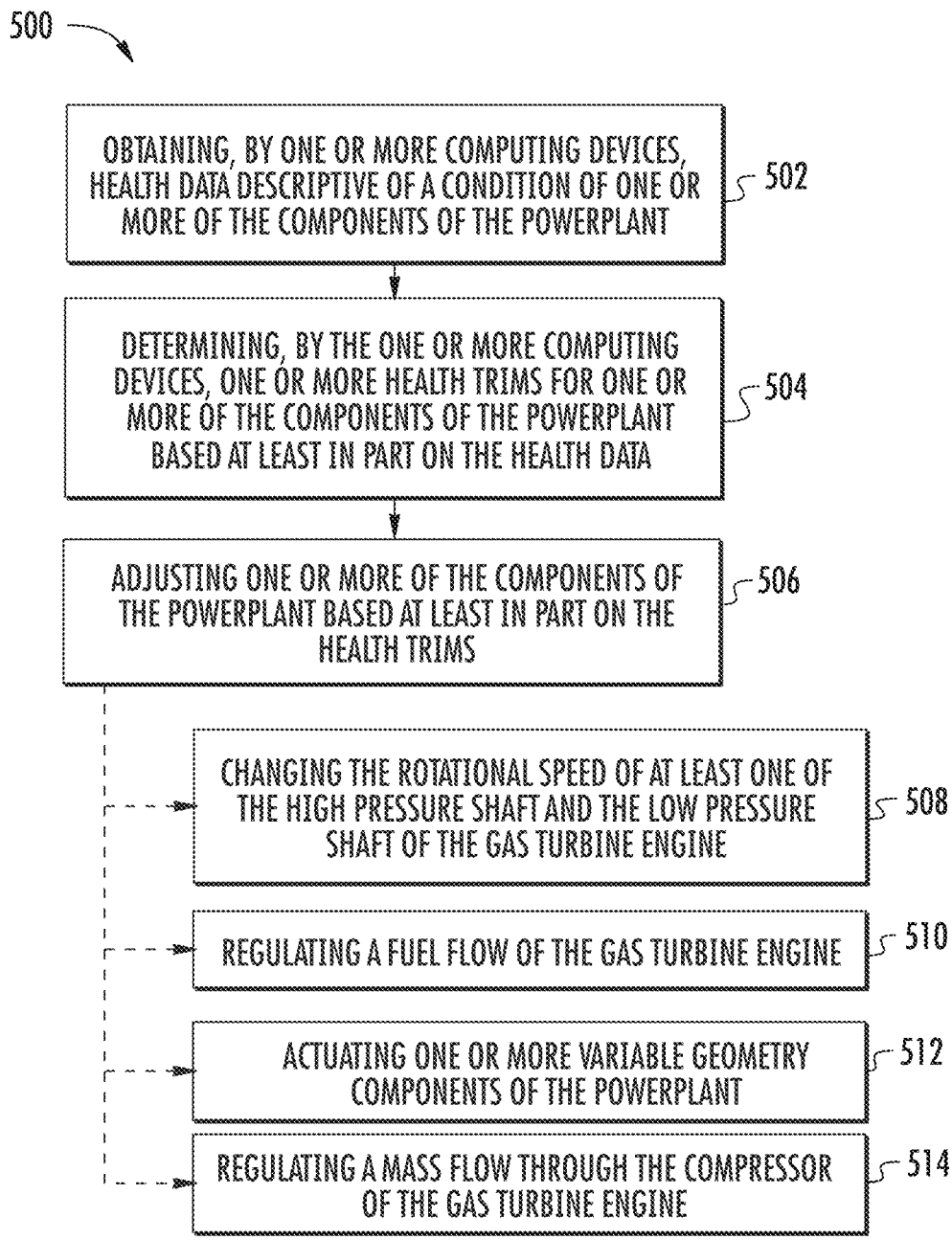
FIG. 5 provides a flow diagram of an exemplary method according to an exemplary embodiment of the present disclosure.

FIG. 5 provides a flow diagram of an exemplary method (500) for controlling the operation of a powerplant that includes one or more components according to an exemplary embodiment of the present disclosure. Some or all of the method (500) can be implemented by control system 400 described herein. Some or all of the method (500) can be performed onboard a vehicle (such as e.g., the aircraft 200 of FIG. 2) in real time. Additionally or alternatively, some or all of the method (500) can be performed offboard of a vehicle or while the powerplant is not in operation.

At (502), exemplary method (500) includes obtaining, by one or more computing devices, health data descriptive of a condition of one or more of the components of the powerplant. For instance, one or more of the computing devices 311 of the control system 400 can obtain health data 460 descriptive of a condition of one or more of the components of the gas turbine engine 100. The health data 460 can be obtained from onboard health model 418, offboard health model 420, a combination of the two, other health models, etc. In some implementations, the health data descriptive of the condition of the one or more components is indicative of a remaining useful life of at least one of the one or more components. Additionally or alternatively, in some exemplary implementations, the health data descriptive of the condition of the one or more components is indicative of an amount of damage to at least one of the one or more components.

In some exemplary implementations, the health data is descriptive of the condition of a plurality of components of the powerplant. For example, the health data 460 can be descriptive of the condition of the HP shaft 128 and the LP shaft 130 of the gas turbine engine 100. As another example, the health data 460 can be descriptive of the condition of one or more stages of compressor blades and stator vanes and one or more stages of turbine blades and stator vanes.

At (504), exemplary method (500) includes determining, by the one or more computing devices, one or more health trims for one or more of the components of the powerplant based at least in part on the health data. For instance, one or more of the computing devices 311 of the control system 400 can determined the health trims 480 based at least in part on the health data 460. As described herein, the health trims 480 represent instructions for actuating one or more of the actuators 360 of the gas turbine engine 100. For example, one health trim 480 can be instructions for actuating fuel control valve 370 such that the fuel flow into the combustion chamber of the combustion section 118 is adjusted.

At (506), exemplary method (500) includes adjusting one or more of the components of the powerplant based at least in part on the health trims. For instance, one or more of the computing devices 311 of the control system 400 can send one or more signals indicative of the health trims 480 (i.e., adjustment instructions) to one or more actuators 360 of the gas turbine engine 100. Based on these signals, the actuators 360 can adjust or actuate the component they are operatively configured to control. In some embodiments, the health trims 480 can be combined with other trims, such as e.g., service trims 484 or performance trims 482, to form a control command that can be sent to one or more actuators 360 for controlling component 406 of the powerplant.

At (508), in some implementations of method (500), the powerplant is a gas turbine engine that includes a low pressure shaft and a high pressure shaft. In such an implementation, adjusting one of the one or more components of the gas turbine engine based at least in part on the health trims includes changing the rotational speed of one of the high pressure shaft and the low pressure shaft of the gas turbine engine. The gas turbine engine can be, for example, the gas turbine engine 100 of FIG. 1. If the health data 460 indicates that the LP shaft 130 of the gas turbine engine 100 is aging faster than the HP shaft 128, the health trim 480 can be determined and the HP shaft 128 can be adjusted such that it is operated in a more intense way so as to improve the overall engine life and time on wing (TOW) of the engine. Additionally or alternatively, a health trim 480 can be determined and the LP shaft 130 can be adjusted such that it is operated in a less intense way so as to improve the service life of the LP shaft 130 and the engine overall. To adjust one or both of the HP and LP shaft 128, 130, for example, the mass flow through a particular section or station of the core air flow path 132 of the gas turbine engine 100 can be adjusted, the fuel/air mixture within the combustion section 118 can be adjusted, the pitch angle of the fan blades 136 can be adjusted so as to increase or decrease the mass flow into the inlet 156 of the gas turbine engine 100, a countertorque to one of the shafts can be applied, such as e.g., by pulsing an electrical machine attached thereto, a combination of the foregoing can be implemented, etc.

At (510), in some implementations of method (500), the powerplant is a gas turbine engine. The gas turbine engine can be, for example, the gas turbine engine 100 of FIG. 1. In such an implementation, adjusting one of the one or more components of the gas turbine engine based at least in part on the health trims includes regulating a fuel flow of the gas turbine engine. For example, the fuel flow delivered to the combustion chamber by a fuel nozzle or fuel/air mixer can be selectively controlled by adjusting a fuel control valve 370 (FIG. 1).

At (512), in some implementations of method (500), adjusting one of the one or more components of the powerplant based at least in part on the health trims includes actuating one or more variable geometry components of the powerplant. The powerplant can be, for example, the gas turbine engine 100 of FIG. 1. As described herein, actuators 360 can be operatively configured to vary the pitch or position of various variable geometry components, such as e.g., the fan OGVs 148, the IGVs of the LP compressor 114, the stator vanes of the HP compressor 116, a combination of the foregoing, or any other variable geometry components of the gas turbine engine 100.

At (514), in some implementations of method (500), the powerplant is a gas turbine engine that includes a compressor. The gas turbine engine can be, for example, the gas turbine engine 100 of FIG. 1. In such an implementation, adjusting one of the one or more components of the gas turbine engine based at least in part on the health trims includes regulating a mass flow through the compressor of the gas turbine engine. This can be done for example, by actuating the fan blades 136 or actuating the IGVs of the LP compressor 114.

In some implementations, in addition to optimizing the life/damage of one or more components of the powerplant, the method (500) further includes obtaining, by the one or more computing devices, an objective function descriptive of one or more performance parameters to optimize during operation of the powerplant. The method also includes determining, by the one or more computing devices, one or more performance trims based at least in part on the objective function. The method further includes adjusting the one or more components of the powerplant based at least in part on the one or more performance trims.

In some implementations, at least one of the one or more computing devices is an onboard computing device. The onboard computing device includes an onboard health model. In such implementations, the method further includes obtaining, by the onboard computing device, engine data from the onboard health model. The method also includes determining, by the onboard computing device, the health data indicative of the condition of one or more of the components of the powerplant.

In some implementations, the method (500) further includes obtaining, by the one or more computing devices, service data descriptive of when one or more of the one or more components of the powerplant are scheduled for servicing. The method also includes determining, by the one or more computing devices, one or more service trims based at least in part on the service data. The method additionally includes adjusting the one or more components of the powerplant based at least in part on the one or more service trims.

In some implementations, the powerplant is a gas turbine engine that includes an afterburner. In such an implementation, adjusting one of the one or more components of the gas turbine engine based at least in part on the health trims includes regulating a fuel flow to the afterburner. For example, suppose the health data is descriptive of one of the shafts of the gas turbine engine. Suppose one of the shafts is deteriorating rapidly and is nearing the end of its service life. In such an example, one or more computing devices 311 of the control system 400 can determine that utilizing the afterburner in a more intense way during takeoff can extend the service life of the engine without endangering the success of the mission. Accordingly, for example, the fuel flow to the afterburner can be increased during takeoff to increase thrust and reduce the stress on the deteriorated shaft.

Figure 6:
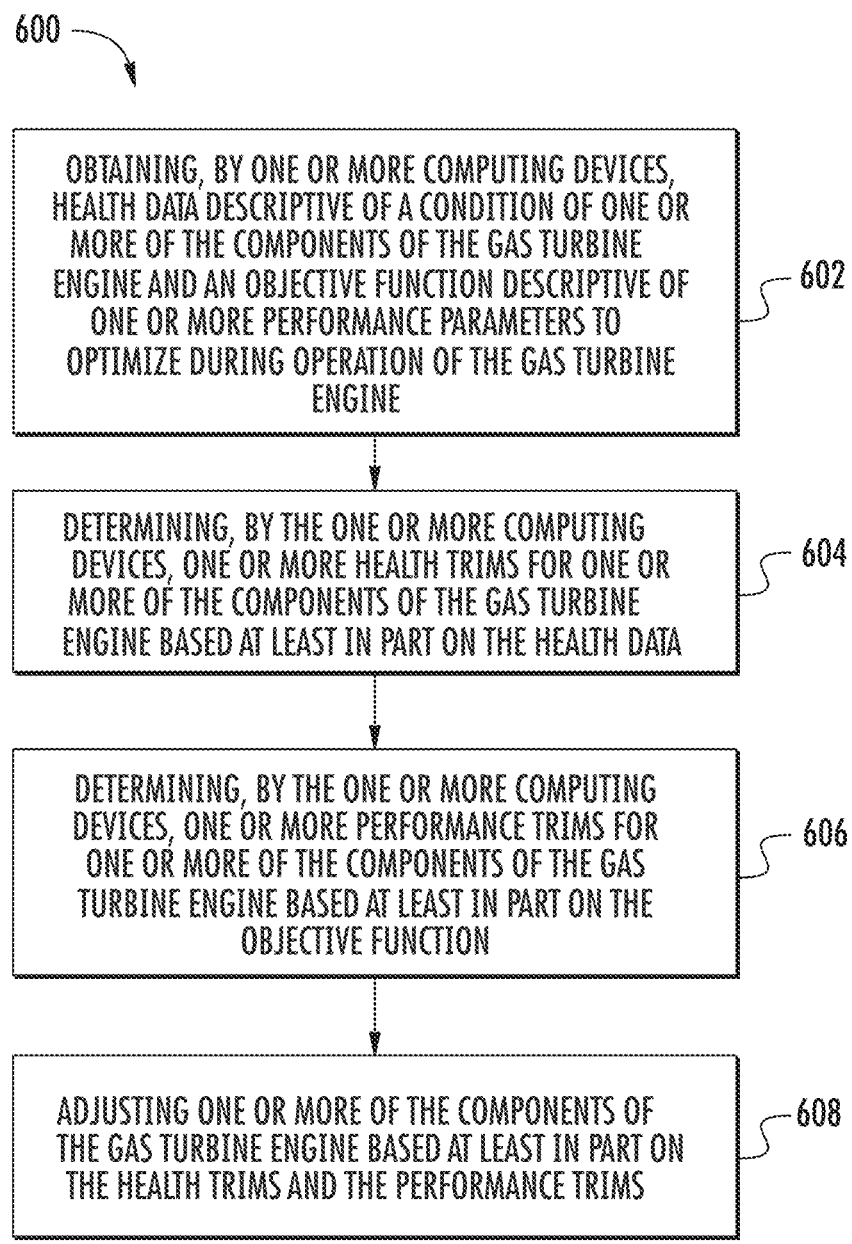
FIG. 6 provides a flow diagram of another exemplary method according to an exemplary embodiment of the present disclosure.

FIG. 6 provides a flow diagram of an exemplary method (600) for controlling the operation of a powerplant that includes one or more components according to an exemplary embodiment of the present disclosure. Some or all of the method (600) can be implemented by control system 400 described herein. Some or all of the method (600) can be performed onboard a vehicle (such as e.g., the aircraft 200 of FIG. 2) in real time. Additionally or alternatively, some or all of the method (600) can be performed offboard of a vehicle or while the powerplant is not in operation.

At (602), the method (600) includes obtaining, by one or more computing devices, health data descriptive of a condition of one or more of the components of the gas turbine engine and an objective function descriptive of one or more performance parameters to optimize during operation of the gas turbine engine. The one or more computing devices can be one or more of the onboard computing devices 311 of the onboard computing system 310, for example. The gas turbine engine can be the gas turbine engine 100 of FIGS. 1-2, for instance. In this implementation, for instance, the one or more computing devices 311 can obtain health data 460 and an objection function 440. In this way, the onboard computing devices 311 can use this data to determine one or more health trims 480 and one or more performance trims 482, as explained below.

At (604), the method (600) includes determining, by the one or more computing devices, one or more health trims for one or more of the components of the gas turbine engine based at least in part on the health data. For instance, one or more of the computing devices of the control system 400 can determine the health trims 480 based on the obtained health data 460 output by one or more health models 410. The health trim 480 can be used to determine a control command 402 that, as mentioned previously, can take into account the determined health trims 480 as well as other inputs, such as e.g., sensor feedback, aircraft communications, service data 470, a combination of foregoing.

At (606), the method (600) includes determining, by the one or more computing devices, one or more performance trims for one or more of the components of the gas turbine engine based at least in part on the objective function. For instance, one or more of the computing devices of the control system 400 can determine the performance trims 482 based on the obtained objective function 440. In addition to the health trims 480, the performance trims 482 can be used to determine a control command 402 that represents a summation or cumulative trim. By taking into account the performance trims 482, the control system 400 can control the gas turbine engine 100 to not only optimize component life/damage, the control system 400 can also optimize engine performance.

At (608), the method (600) includes adjusting one or more of the components of the gas turbine engine based at least in part on the health trims and the performance trims. For instance, as noted above, the health trims 480 and the performance trims 482 can summed into a cumulative control command 402 representative of how one or more actuators should control their associated one or more components of the gas turbine engine. By forming a cumulative control command 402 that takes into account the health trims 480 and the performance trims 482, the control system 400 can optimize the engine component life/damage as well as engine performance.

In some implementations, the method (600) further includes obtaining, by the one or more computing devices, service data descriptive of when one or more of the one or more components of the gas turbine engine are scheduled for servicing. The method also includes determining, by the one or more computing devices, one or more service trims based at least in part on the service data. The method further includes adjusting one or more of the one or more components of the gas turbine engine based at least in part on the service trims. In this way, the control system 400 can optimize the gas turbine engine 100 based on service data 470.

In some implementations, at least one of the one or more computing devices is one or more onboard computing devices and at least one of the one or more computing devices is one or more offboard computing devices. In such an implementation, the one or more onboard computing devices include an engine model and an onboard health model and the one or more offboard computing devices includes an offboard health model. In such implementations, the method further includes obtaining, by the one or more onboard computing devices, engine data from the onboard health model indicative of one or more operating parameters of the gas turbine engine during operation. The method also includes obtaining, by the one or more offboard computing devices, engine data indicative of one or more operating parameters of the gas turbine engine during operation. The method further includes determining, by the one or more onboard computing devices, the health data indicative of the condition of one or more of the components of the gas turbine engine. The method also includes determining, by the one or more offboard computing devices, the health data indicative of the condition of one or more of the components of the gas turbine engine. In such implementations, at least a portion of the health data obtained by the one or more computing devices is the health data determined by the one or more onboard computing devices and at least a portion of the health data obtained by the one or more computing devices is the health data determined by the one or more offboard computing devices.

Figure 7:
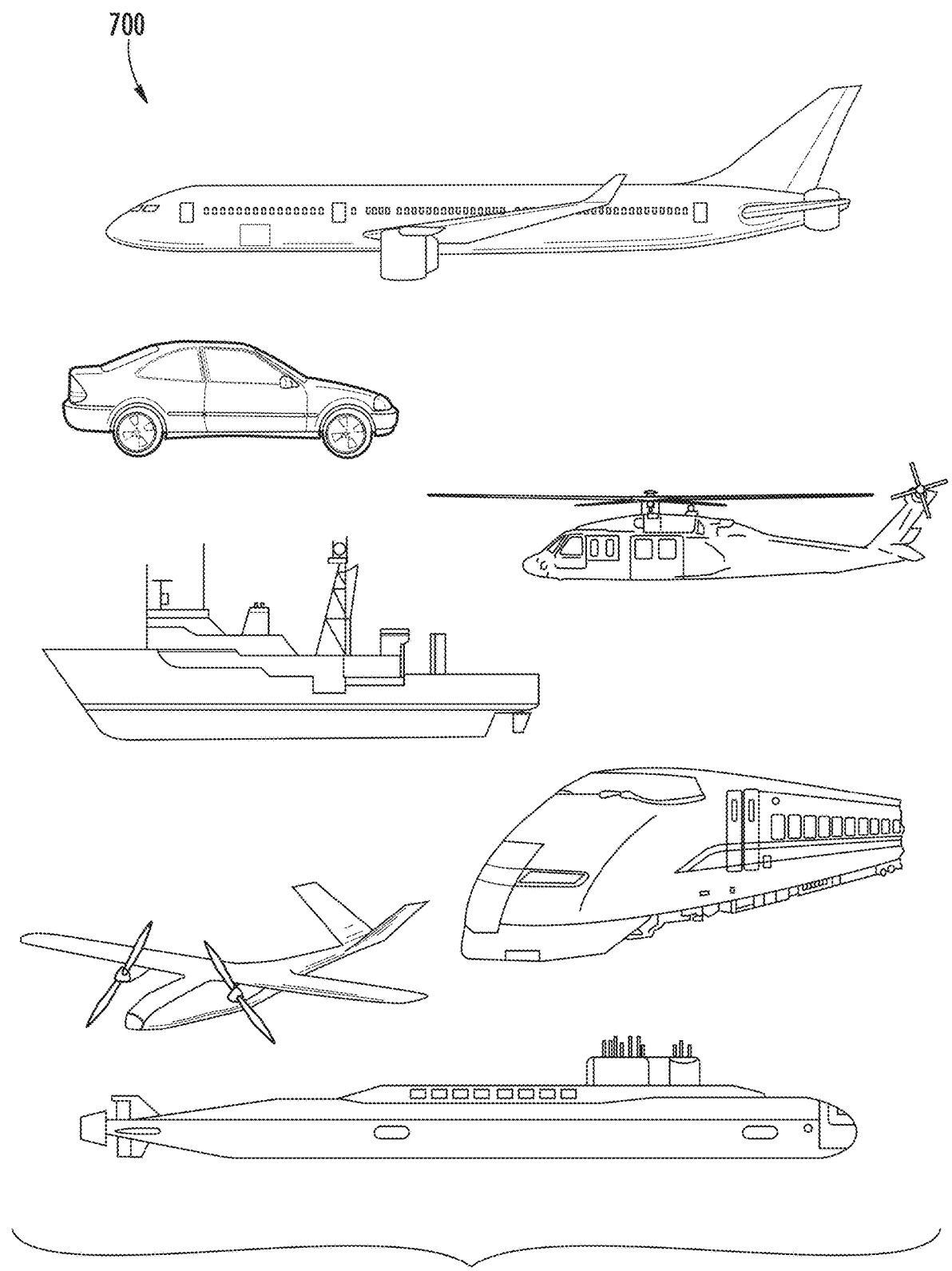
FIG. 7 provides exemplary vehicles according to exemplary embodiments of the present disclosure.

FIG. 7 provides exemplary vehicles 700 according to exemplary embodiments of the present disclosure. The systems and methods of the present disclosure can be implemented on an aircraft, helicopter, automobile, boat, submarine, train, unmanned aerial vehicle or drone and/or any other suitable vehicles. While the present disclosure is described herein with reference to an aircraft implementation, this is intended only to serve as an example and not to be limiting. It will be appreciated that the systems and methods of the present disclosure can be implemented on other vehicles without deviating from the scope of the present disclosure. For instance, aspects of the present disclosure may be utilized with other types of powerplants, such as e.g., power generation turbine engines or aeroderivative gas turbine engines.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel. Furthermore, computing tasks discussed herein as being performed at computing device(s) remote from the vehicle can instead be performed at the vehicle (e.g., via the onboard computing system), or vice versa. Such configurations can be implemented without deviating from the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for controlling operation of a powerplant comprised of one or more components, the method comprising:

obtaining, by one or more computing devices, health data descriptive of a condition of one or more of the components of the powerplant;

determining, by the one or more computing devices, one or more health trims for one or more of the components of the powerplant based at least in part on the health data, the one or more health trims indicative of instructions for adjusting the one or more components during operation of the powerplant;

causing, by the one or more computing devices, adjustment of one or more of the one or more components of the powerplant during operation of the powerplant such that a power output of the powerplant is changed in real time based at least in part on the one or more health trims.

2. The method of claim 1, wherein the method further comprises:

obtaining, by the one or more computing devices, an objective function descriptive of one or more performance parameters to optimize during operation of the powerplant;

determining, by the one or more computing devices, one or more performance trims based at least in part on the objective function; and causing, by the one or more computing devices, adjustment of the one or more components of the powerplant based at least in part on the one or more performance trims.

3. The method of claim 1, wherein at least one of the one or more computing devices is one or more onboard computing devices, the one or more onboard computing devices comprising an onboard health model, and wherein the method further comprises:

obtaining, by the one or more onboard computing devices, engine data indicative of one or more operating parameters of the powerplant during operation; and determining, by the one or more onboard computing devices, the health data indicative of the condition of one or more of the components of the powerplant;

wherein at least a portion of the health data obtained by the one or more computing devices is the health data determined by the one or more onboard computing devices.

4. The method of claim 3, wherein at least one of the one or more computing devices is one or more offboard computing devices, the one or more offboard computing devices comprising an offboard health model, and wherein the method further comprises:

obtaining, by the one or more offboard computing devices, engine data indicative of one or more operating parameters of the powerplant during operation; and determining, by the one or more offboard computing devices, the health data indicative of the condition of one or more of the components of the powerplant;

wherein at least a portion of the health data obtained by the one or more computing devices is the health data determined by the one or more onboard computing devices and at least a portion of the health data is the health data determined by the one or more offboard computing devices.

5. The method of claim 1, wherein the one or more computing devices obtain the health data descriptive of a condition of one or more of the components of the powerplant; determine the one or more health trims for one or more of the components of the powerplant based at least in part on the health data; and cause adjustment of one or more of the one or more components of the powerplant during operation of the powerplant based at least in part on the one or more health trims in real time.

6. The method of claim 1, wherein the health data descriptive of the condition of the one or more components is indicative of a remaining useful life of at least one of the one or more components.

7. The method of claim 1, wherein the health data descriptive of the condition of the one or more components is indicative of an amount of damage to at least one of the one or more components.

8. The method of claim 1, wherein the powerplant is a gas turbine engine.

9. The method of claim 1, wherein the powerplant is a gas turbine engine comprising a low pressure shaft and a high pressure shaft, and wherein causing, by the one or more computing devices, adjustment of one of the one or more components of the gas turbine engine during operation of the powerplant based at least in part on the one or more health trims comprises:
 causing, by the one or more computing devices, a change in a rotational speed of at least one of the high pressure shaft and the low pressure shaft of the gas turbine engine.

10. The method of claim 1, wherein the powerplant is a gas turbine engine, and wherein causing, by the one or more computing devices, adjustment of one of the one or more components of the gas turbine engine during operation of the powerplant based at least in part on the one or more health trims comprises:
 causing, by the one or more computing devices, regulation of a fuel flow of the gas turbine engine.

11. The method of claim 1, wherein causing, by the one or more computing devices, adjustment of one of the one or more components of the powerplant during operation of the powerplant such that a power output of the powerplant is changed in real time based at least in part on the one or more health trims comprises:
 causing, by the one or more computing devices, actuation of one or more variable geometry components of the powerplant.

12. The method of claim 1, wherein the powerplant is a gas turbine engine comprising a compressor, and wherein causing, by the one or more computing devices, adjustment of one of the one or more components of the gas turbine engine during operation of the powerplant based at least in part on the one or more health trims comprises:
 causing, by the one or more computing devices, regulation of a mass flow through the compressor of the gas turbine engine.

13. The method of claim 1, wherein the method further comprises:
 obtaining, by the one or more computing devices, service data descriptive of when one or more of the one or more components of the powerplant are scheduled for servicing;
 determining, by the one or more computing devices, one or more service trims based at least in part on the service data; and
 causing, by the one or more computing devices, adjustment of the one or more components of the powerplant during operation of the powerplant based at least in part on the one or more service trims.

14. A gas turbine engine, the gas turbine engine comprising a compressor section, a combustion section, and a turbine section arranged in serial flow order, the compressor section, the combustion section, and the turbine section at least partially defining a core air flowpath, the gas turbine engine also comprising a rotary component rotatable with at least one of a portion of the compressor section and a portion of the turbine section, the gas turbine engine further comprising:
 a control system, comprising:
 one or more actuators operatively configured to actuate one or more components of the gas turbine engine;
 a computing system comprising one or more computing devices communicatively coupled with the one or more actuators, the one or more computing devices comprising one or more processors and one or more memory devices, the one or more memory devices storing instructions that when executed by the one or more processors cause the one or more processors to perform operations, the one or more computing devices configured to:
 obtain health data descriptive of a condition of one or more of the components of the gas turbine engine;
 determine one or more health trims for one or more of the components of the gas turbine engine based at least in part on the health data, the one or more health trims indicative of instructions for actuating the one or more components during operation of the gas turbine engine; and
 control the one or more actuators during operation of the gas turbine engine to adjust the one or more components of the gas turbine engine to adjust a power output of the gas turbine engine in real time based at least in part on the one or more health trims.

15. The gas turbine engine of claim 14, wherein at least one of the one or more computing devices comprises a health model, wherein the one or more computing devices are further configured to:
 obtain engine data indicative of one or more operating parameters of the powerplant during operation; and
 determine, by using the health model, the health data indicative of the condition of one or more of the components of the powerplant.

16. The gas turbine engine of claim 14, wherein the control system further comprises:
 one or more sensors for sensing the position of the one or more components of the gas turbine engine during operation;
 wherein the one or more computing devices of the computing system are communicatively coupled with the one or more sensors, and wherein the one or more computing devices of the computing system are further configured to:
 obtain one or more communications indicative of a current position of the one or more components of the gas turbine engine during operation;
 compare the current position of the one or more components of the gas turbine engine with the health trims associated with the component;
 determine a delta between the current position and the health trims associated with the component;
 control the one or more actuators associated with the component to adjust the component based at least in part on the delta.

17. The gas turbine engine of claim 14, wherein at least one of the one or more computing devices comprises optimizing control logic operatively configured to control the one or more actuators to adjust the one or more components of the gas turbine engine based at least in part on the one or more health trims, and wherein prior to controlling the one or more actuators, the one or more computing devices are further configured to:
 initialize the optimizing control logic to control the one or more actuators;
 wherein when the control logic is initialized, the optimizing control logic controls the one or more actuators to actuate the one or more components of the gas turbine engine, and when the control logic is not initialized, the optimizing control logic does not control the one or more actuators to actuate the one or more components of the gas turbine engine.

18. A method for controlling operation of a gas turbine engine for a vehicle, the gas turbine engine comprised of one or more components, the method comprising:

obtaining, by one or more computing devices, health data descriptive of a condition of one or more of the components of the gas turbine engine and an objective function descriptive of one or more performance parameters to optimize during operation of the gas turbine engine;

determining, by the one or more computing devices, one or more health trims for one or more of the components of the gas turbine engine based at least in part on the health data, the one or more health trims indicative of instructions for adjusting the one or more components during operation of the gas turbine engine;

determining, by the one or more computing devices, one or more performance trims for one or more of the components of the gas turbine engine based at least in part on the objective function; and causing, by the one or more computing devices, adjustment of one or more of the components of the gas turbine engine during operation of the gas turbine engine such that a power output of the gas turbine engine is changed in real time based at least in part on the health trims and the performance trims.

19. The method of claim 18, wherein the method further comprises:

obtaining, by the one or more computing devices, service data descriptive of when one or more of the one or more components of the gas turbine engine are scheduled for servicing;

determining, by the one or more computing devices, one or more service trims based at least in part on the service data;

adjusting one or more of the one or more components of the gas turbine engine based at least in part on the service trims.

20. The method of claim 18, wherein at least one of the one or more computing devices is one or more onboard computing devices and at least one of the one or more computing devices is one or more offboard computing devices, the one or more onboard computing devices comprising an onboard health model and the one or more offboard computing devices comprising an offboard health model, and wherein the method further comprises:

obtaining, by the one or more onboard computing devices, engine data indicative of one or more operating parameters of the gas turbine engine during operation;

obtaining, by the one or more offboard computing devices, engine data indicative of one or more operating parameters of the gas turbine engine during operation;

determining, by the one or more onboard computing devices, the health data indicative of the condition of one or more of the components of the gas turbine engine;

determining, by the one or more offboard computing devices, the health data indicative of the condition of one or more of the components of the gas turbine engine;

wherein at least a portion of the health data obtained by the one or more computing devices is the health data determined by the one or more onboard computing devices and at least a portion of the health data obtained by the one or more computing devices is the health data determined by the one or more offboard computing devices.

* * * * *